US011511488B2

(12) United States Patent
Grebe et al.

(10) Patent No.: US 11,511,488 B2
(45) Date of Patent: Nov. 29, 2022

(54) DEVICE FOR PRODUCING THREE-DIMENSIONAL OBJECTS LAYER BY LAYER

(71) Applicant: Evonik Operations GmbH, Essen (DE)

(72) Inventors: Maik Grebe, Bochum (DE); Wolfgang Diekmann, Waltrop (DE); Sigrid Hessel, Haltern am See (DE); Maximilian Gruhn, Marl (DE)

(73) Assignee: Evonik Operations GmbH, Essen (DE)

(*) Notice: Subject to any disclaimer, the term of this patent is extended or adjusted under 35 U.S.C. 154(b) by 0 days.

(21) Appl. No.: 15/733,258

(22) PCT Filed: Dec. 17, 2018

(86) PCT No.: PCT/EP2018/085165
§ 371 (c)(1),
(2) Date: Jun. 18, 2020

(87) PCT Pub. No.: WO2019/121490
PCT Pub. Date: Jun. 27, 2019

(65) Prior Publication Data
US 2020/0307085 A1 Oct. 1, 2020

(30) Foreign Application Priority Data

Dec. 22, 2017 (EP) .................................... 17210030

(51) Int. Cl.
B22F 12/30 (2021.01)
B22F 10/28 (2021.01)
(Continued)

(52) U.S. Cl.
CPC ............ *B29C 64/245* (2017.08); *B22F 12/30* (2021.01); *B29C 64/153* (2017.08); *B33Y 10/00* (2014.12); *B33Y 30/00* (2014.12)

(58) Field of Classification Search
CPC ..... B29C 64/245; B29C 64/153; B33Y 10/00; B33Y 30/00; B22F 12/30
See application file for complete search history.

(56) References Cited

U.S. PATENT DOCUMENTS 6,136,948 A 10/2000 Dickens, Jr. et al.
6,243,616 B1 6/2001 Droscher et al.
(Continued)

FOREIGN PATENT DOCUMENTS

CN 206589342 U 10/2017
DE 101 08 612 C1 6/2002
(Continued)

OTHER PUBLICATIONS

U.S. Pat. No. 8,652,278, Feb. 18, 2014, 2011/0143108, Fruth et al.
(Continued)

Primary Examiner — Joseph S Del Sole
Assistant Examiner — Baileigh Kate Darnell
(74) Attorney, Agent, or Firm — Grüneberg and Myers, PLLC

(57) ABSTRACT

A device produces three-dimensional objects layer by layer in a powder bed fusion process. The device includes a building space, at least one energy source, a building area with a building space platform and a building space container laterally confining the building space platform. The building space platform has an upper side, facing a powder, and an underside, facing away from the powder. The upper side of the building space platform includes a material with a thermal conductivity of at least 20 W/(m·K) and the underside of the building space platform includes a material (Continued)

with a thermal conductivity of a maximum of 0.5 W/(m·K). The contact surface of the upper side of the building space platform with respect to the powder or with respect to the cooling medium is raised by at least 20% in comparison with the planar surface of a building space platform.

18 Claims, 3 Drawing Sheets

(51) Int. Cl.
  *B22F 12/20* (2021.01)
  *B29C 64/245* (2017.01)
  *B33Y 10/00* (2015.01)
  *B33Y 30/00* (2015.01)
  *B29C 64/153* (2017.01)

(56) References Cited

U.S. PATENT DOCUMENTS

| | | | |
|---|---|---|---|
| 6,531,086 | B1 | 3/2003 | Larsson |
| 6,617,546 | B2 | 9/2003 | Manetsberger et al. |
| 6,858,816 | B2 | 2/2005 | Manetsberger et al. |
| 8,409,483 | B2 | 4/2013 | Fruth |
| 8,652,278 | B2 | 2/2014 | Fruth et al. |
| 9,144,941 | B2 | 9/2015 | Grebe et al. |
| 9,162,392 | B2 | 10/2015 | Grebe et al. |
| 9,238,310 | B2 | 1/2016 | Grebe et al. |
| 9,272,446 | B2 | 3/2016 | Grebe et al. |
| 9,643,359 | B2 | 5/2017 | Baumann et al. |
| 10,307,935 | B2 | 6/2019 | Devaraj et al. |
| 10,356,849 | B2 | 7/2019 | Grebe et al. |
| 10,632,730 | B2 | 4/2020 | Grebe et al. |
| 2002/0158054 | A1 | 10/2002 | Manetsberger et al. |
| 2003/0201255 | A1 | 10/2003 | Manetsberger et al. |
| 2007/0238056 | A1 | 10/2007 | Baumann et al. |
| 2010/0320649 | A1 | 12/2010 | Niebling |
| 2011/0143108 | A1 | 6/2011 | Fruth et al. |
| 2011/0156300 | A1 | 6/2011 | Fruth |
| 2011/0252618 | A1 | 10/2011 | Diekmann et al. |
| 2012/0202012 | A1 | 8/2012 | Grebe et al. |
| 2013/0101803 | A1 | 4/2013 | Grebe et al. |
| 2013/0177766 | A1 | 7/2013 | Grebe et al. |
| 2013/0177767 | A1 | 7/2013 | Grebe et al. |
| 2013/0183493 | A1 | 7/2013 | Grebe et al. |
| 2013/0183494 | A1 | 7/2013 | Grebe et al. |
| 2013/0216836 | A1 | 8/2013 | Grebe et al. |
| 2013/0228302 | A1* | 9/2013 | Rickenbacher ......... B22F 12/00 164/492 |
| 2014/0079916 | A1 | 3/2014 | Grebe et al. |
| 2016/0176118 | A1 | 6/2016 | Reese et al. |
| 2016/0214211 | A1 | 7/2016 | Gregg et al. |
| 2017/0151631 | A1 | 6/2017 | Kuo et al. |
| 2017/0190106 | A1* | 7/2017 | Liao .................... B29C 64/321 |
| 2017/0190120 | A1* | 7/2017 | Bloome ................ B33Y 50/02 |
| 2017/0217052 | A1* | 8/2017 | Wu ....................... B33Y 10/00 |
| 2017/0274591 | A1 | 9/2017 | Grebe et al. |
| 2017/0317259 | A1 | 11/2017 | Hatch et al. |
| 2018/0079033 | A1 | 3/2018 | Krueger et al. |
| 2018/0098384 | A1 | 4/2018 | Grebe et al. |
| 2018/0281232 | A1 | 10/2018 | Devaraj et al. |
| 2019/0030791 | A1 | 1/2019 | Reznik |
| 2019/0240869 | A1 | 8/2019 | Devaraj et al. |
| 2020/0230937 | A1 | 7/2020 | Grebe et al. |

FOREIGN PATENT DOCUMENTS

| | | |
|---|---|---|
| DE | 102015205314 | 9/2016 |
| EP | 1 264 679 | 12/2002 |
| EP | 1 740 367 | 11/2009 |
| EP | 2 377 669 | 10/2011 |
| EP | 3199268 | 8/2017 |
| JP | H09506553 | 6/1997 |
| JP | 2011-2018744 | 11/2011 |
| JP | 2017-200727 | 11/2017 |
| WO | 96/06881 | 3/1996 |
| WO | 2016/184994 | 11/2016 |
| WO | WO-2016184994 A1 * | 11/2016 ............. B29C 71/02 |

OTHER PUBLICATIONS

U.S. Pat. No. 8,409,483, Apr. 2, 2013, 2011/0156300, Carl Johannes Fruth.
U.S. Appl. No. 12/528,456, filed Oct. 1, 2009, 2010/0320649, Frank Niebling.
U.S. Appl. No. 13/086,860, filed Apr. 14, 2011, 2011/0252618, Diekmann et al.
U.S. Pat. No. 9,144,941, Sep. 29, 2015, 2012/0202012, Grebe et al.
U.S. Appl. No. 13/552,891, filed Jul. 19, 2012, 2013/0183494, Grebe et al.
U.S. Pat. No. 9,238,310, Jan. 19, 2016, 2013/0183493, Grebe et al.
U.S. Pat. No. 9,162,392, Oct. 20, 2015, 2013/0101803, Grebe et al.
U.S. Appl. No. 13/722,159, filed Dec. 20, 2012, 2013/0177766, Grebe et al.
U.S. Appl No. 13/733,465, filed Jan. 3, 2013, 2013/0177767, Grebe et al.
U.S. Pat. No. 9,272,446, Mar. 1, 2016, 2013/0216836, Grebe et al.
U.S. Appl. No. 14/029,153, filed Sep. 17, 2013, 2014/0079916, Grebe et al.
U.S. Pat. No. 10,632,730, Apr. 28, 2020, 2017/0274591, Grebe et al.
U.S. Appl. No. 16/803,464, filed Feb. 27, 2020, 2020/0230937, Grebe et al.
U.S. Appl. No. 62/271,116, filed Dec. 22, 2015, Devaraj et al.
U.S. Pat. No. 10,307,935, Jun. 4, 2019, 2018/0281232, Devaraj et al.
U.S. Appl. No. 16/385,863, filed Apr. 16, 2019, 2019/0240869, Devaraj et al.
U.S. Pat. No. 10,356,849, Jul. 16, 2019, 2018/0098384, Grebe et al.
International Search Report dated Mar. 22, 2019 in PCT/EP2018/085165 with English translation, 6 pages.
Written Opinion dated Mar. 22, 2019 in PCT/EP2018/085165 with English translation, 11 pages.
Office Action dated Jul. 26, 2021 in Japanese Patent Application 2020-534401 (with partial translation).

\* cited by examiner

DEVICE FOR PRODUCING THREE-DIMENSIONAL OBJECTS LAYER BY LAYER

CROSS-REFERENCE TO RELATED APPLICATIONS

This application is a National Stage entry under § 371 of international Application No. PCT/EP2018/085165, filed on Dec. 17, 2018, and which claims the benefit of European Application No. 17210030.7, filed on Dec. 22, 2017, the content of both of which are hereby incorporated by reference in their entireties.

BACKGROUND OF THE INVENTION

Field of the Invention

The present invention relates to an apparatus for layer-by-layer production of three-dimensional objects in a powder bed fusion method, and to a powder bed fusion method.

Discussion of the Background

The rapid provision of prototypes or small batches is a problem that has frequently been encountered in recent times. Methods that enable this are called rapid prototyping, rapid manufacturing, additive fabrication methods, or else simply 3d printing. Particularly suitable methods are those in which the desired structures are produced layer by layer, by selective melting and/or consolidation of pulverulent materials. The methods that work according to this principle are summarized in ISO/ASTM 52900 or ISO 17296-2 using the umbrella term "Powder Bed Fusion".

One example of powder bed fusion methods is laser sintering, which is described in detail in specifications US 6136948 and WO 96/06881. Further examples of powder bed fusion methods are described in documents US 6531086 and EP 1740367 (US 2007/238056).

In the powder bed fusion methods, powders composed of metallic, ceramic or else polymeric materials are used. For minimization of warpage of the three-dimensional objects to be produced, it is usually necessary to control the temperature in the construction space. DE 10108612 (US 2002/158054) describes an apparatus in which, by means of shell heating of the construction space, warpage of the three-dimensional objects is to be avoided. However, the heating of the shell of the construction space has the great disadvantage that the powder in the construction space container is then exposed to thermal stress for a longer period. Moreover, the temperature distribution to be established in the shell of the construction space which is described in this document is implemented by means of separate temperature control of regions, which requires a complex apparatus. However, prolonged thermal stress specifically in the case of polymeric materials leads to unwanted changes in the powder material, such as thermooxidative damage, or to a significant increase in molecular weight. Both effects are unwanted since these adversely affect the recyclability of the powder.

SUMMARY OF THE INVENTION

The problem addressed by the present invention was therefore that of minimizing the warpage of the three-dimensional objects produced and, at the same time, the thermal stress on the powder material. The powder should undergo a minimum increase in molecular weight.

In the case of apparatuses which are used in powder bed fusion methods, the direction of construction progress (direction of lowering of the construction space platform on which the three-dimensional object is formed) is defined as the z axis. The z axis thus stands vertically on the plane of the construction field. One problem in the prior art is that the mechanical characteristics in z direction are highly dependent on the position of the object in the construction field. Elongation at break in particular is significantly poorer in the edge regions than in the middle of the construction field. A further problem addressed is therefore that of improving the mechanical characteristics of the parts of the three-dimensional object that are manufactured in the edge region (outer region) of the construction field. As a result, the mechanical characteristics of the three-dimensional objects should be at the same level irrespective of the position in the construction field.

What has accordingly been found is a novel apparatus for layer-by-layer production of three-dimensional objects in a powder bed fusion method. The apparatus comprises a construction space, at least one energy source, a construction field having a construction space platform, and a construction space container that laterally bounds the construction space platform. The construction space platform has an upper side facing a powder and a lower side remote from the powder. The upper side of the construction space platform comprises a material having a thermal conductivity of at least 20 W/(m·K), and the lower side of the construction space platform comprises a material having a thermal conductivity of not more than 0.5 W/(m·K). In this way, a construction space platform is provided, the upper side of which comprises a material of good thermal conductivity and the lower side of which a material of poor thermal conductivity. Preferably, the upper side of the construction space platform consists of a material having a thermal conductivity of at least 20 W/(m·K), and the lower side of the construction space platform of a material having a thermal conductivity of not more than 0.5 W/(m·K).

DETAILED DESCRIPTION OF THE INVENTION

Figure 1:
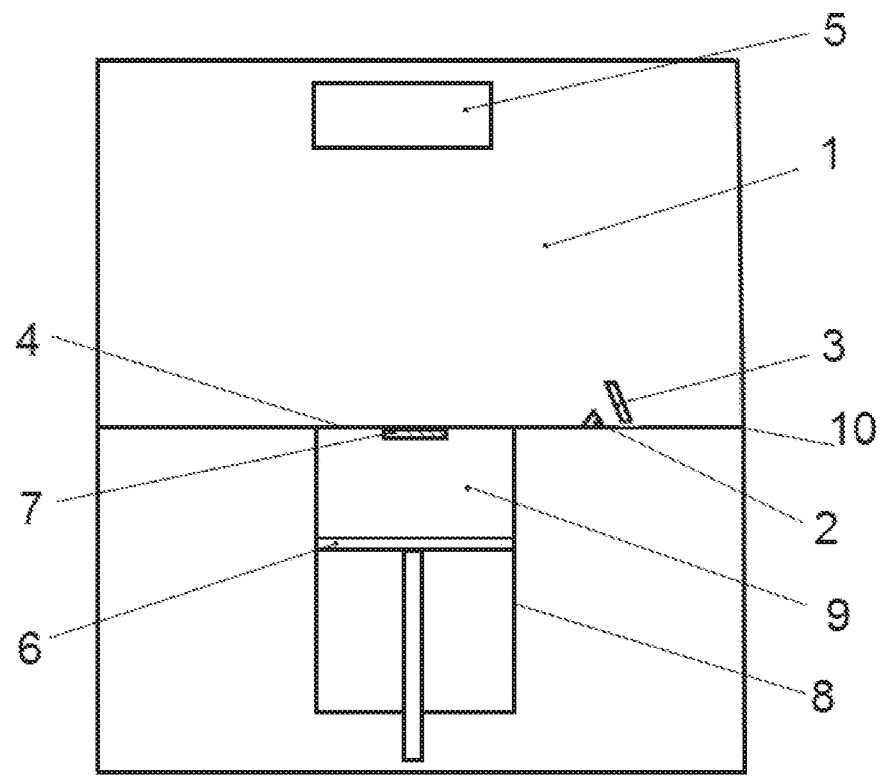
FIG. 1 shows the basic construction of an apparatus for production of three-dimensional objects.

The apparatus of the invention comprising an aforementioned construction space platform gives three-dimensional objects which exhibit lower warpage and good and homogeneous mechanical characteristics. Moreover, there is lower thermal stress on the powder.

Preferably, the construction space platform includes devices which enable cooling of the upper side of the platform. For this purpose, one or more flow machines that are driven from the outside may be integrated on the lower side of the construction platform, Additionally or alternatively, the construction space platform may exhibit at least one inlet for a cooling medium and at least one outlet for a cooling medium. Preferably, the inlet and outlet are each arranged on the lower side of the platform.

In a preferred embodiment of the invention, the construction space container has an outer face that faces the construction space platform, wherein the outer face comprises or preferably consists of a material having a thermal conductivity of not more than 0.5 W/(m·K), Preferably, the outer face has a wall thickness of at least 10 mm. The wall thickness is preferably at least 40 mm, more preferably at least 80 mm.

With the design of the outer face of the construction space container as a thermal insulator, it is possible to dispense with the complex temperature control of the construction space container and additionally to reduce the thermal stress on the powder and to further reduce the warpage of the three-dimensional objects produced.

The material of the outer face of the construction space container and the material of the lower side of the construction space platform may be the same or different, Preferably, the material in each case has a thermal conductivity of less than 0.3 W/(m·K), more preferably less than 0.1 W/(m·K) in each case and most preferably less than 0.05 W/(m·K) in each case. The material for the upper side preferably has a thermal conductivity of at least 80 W/(m·K), preferably of at least 140 W/(m·K).

Thermal conductivity is determined at 23° C. according to ASTM E1461 (LFA457 Micro Flash from Netzsch, sample thickness 2 mm, sample conditioning at 23° C./50% for 48 h). Suitable materials that exhibit these heat-insulating properties are, for example, foam glass, foam ceramic, expanded perlite, porous concrete, wood, high-temperature polymers such as polyetheretherketones or thermally stable thermosets.

The construction space platform may be configured such that cooling of the powder provided (powder cake) is possible during the construction process or after the construction process. The construction space platform is preferably cooled by conduction of heat and/or convection. The cooling output can be kept at the desired value by means of closed-loop control.

A preferred powder is a polymer powder. Suitable polymers of the powder powders are selected from polyamides, polyolefins such as polyethylene and polypropylene, polyesters and polyaryletherketones (PAEK) such as polyetheretherketone. Suitable polyamides may be conventional and known polyamides. Polyamides comprise homopolyamides and copolyamides. Suitable polyamides or copolyamides are selected from nylon-6, 11, 12, 10,13, 10,12, 6.6, 4.6, 6.13, 10.6, 11/10.10, 12.12 and 12/10.12. A preferred polyamide is selected from nylon-11, 12, 10.13, 10.12, 66, 6.13, 11/10.10, 12.12 and 12/1012, more preferably nylon-11 or 12 and most preferably nylon-12.

The apparatus according to the invention is elucidated hereinafter with reference to the figures.

FIG. 1 shows the basic construction of an apparatus for production of three-dimensional objects according to the prior art (front view) in a powder bed fusion method. The construction space (1) encompasses the entire region within which the three-dimensional objects are produced. A suitable sliding device (3) such as a roller, cylinder or coating bar applies the powder (2) across the construction field plane (10) to the construction field (4). The powder temperature is controlled by means of a heat source. An electromagnetic energy source (5), for example a laser, selectively melts or sinters a region on the construction field surface. The construction space platform (6) is lowered in accordance with a defined layer thickness and the operation is repeated until a three-dimensional object (7) has been formed layer by layer. The construction space container (8) encloses the powder cake (9) and any three-dimensional objects (7) present therein. The powder cake is bounded laterally by the outer face of the construction space container, and bounded in the upward direction by the construction field and in the downward direction by the construction space platform. The outer face of the construction space container is heated according to the prior art.

Figure 2:
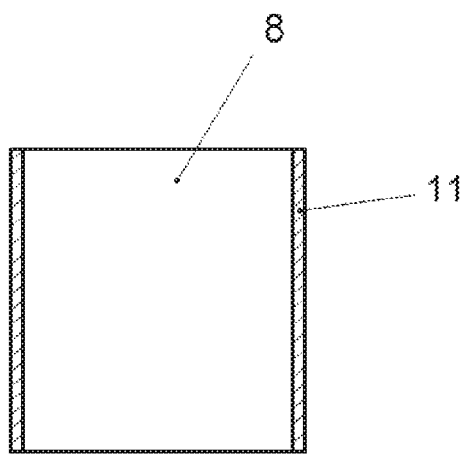
FIG. 2 shows the configuration of the construction space container according to the invention (front view, in section).

FIG. 2 shows, by way of example, the configuration of the construction space container (8) according to the invention (front view, in section). The outer face of the construction space container (11) preferably consists of a thermally insulating material having a wall thickness of at least 10 mm.

Figure 3:
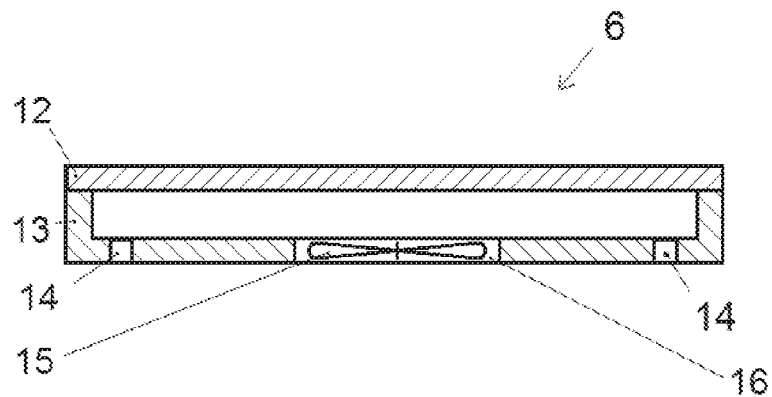
FIG. 3 shows an inventive embodiment of the construction space platform.

FIG. 3 shows, by way of example, an inventive embodiment of the construction space platform (6). The construction space platform (6) comprises an upper side (12) and a lower side (13). A flow machine (15) driven from the outside and having controllable speed is mounted on the lower side (13) of the platform. For better flow, the lower side (13), as well as an inlet (16) for air, also has one or more outlets (14). The upper side (12) preferably consists of a material having good thermal conductivity (i.e. a thermal conductivity of at least 20 W/(m·K)), and the lower side (13) preferably consists of a material having poor thermal conductivity (i.e. a thermal conductivity of not more than 0.5 W/(m·K)).

Figure 4:
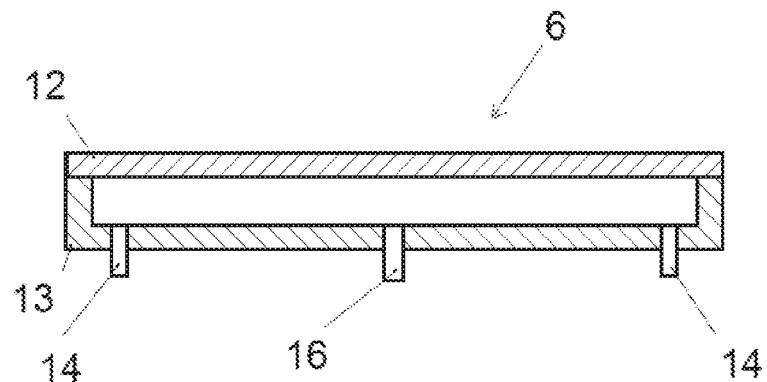
FIG. 4 shows a further embodiment of the invention. The construction space platform is configured such that a cooling medium can flow through it.
Figure 6:
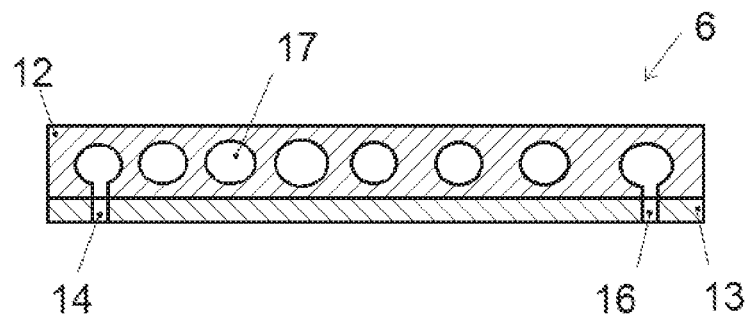
FIG. 6 shows an example of an embodiment where the upper side is permeated by cooling channels.

A further embodiment of the invention is shown in FIG. 4. The construction space platform (6) is configured such that a cooling medium can flow through it. The lower side (13) has an inflow (16) and one or more outflows (14) for the cooling medium. The cooling medium may be gaseous or liquid. Here too, the upper side (12) preferably consists of a material having good thermal conductivity, and the lower side (13) preferably consists of a material having poor thermal conductivity. A further embodiment is shown in FIG. 6, where the upper side (12) is permeated by cooling channels (17).

Figure 5:
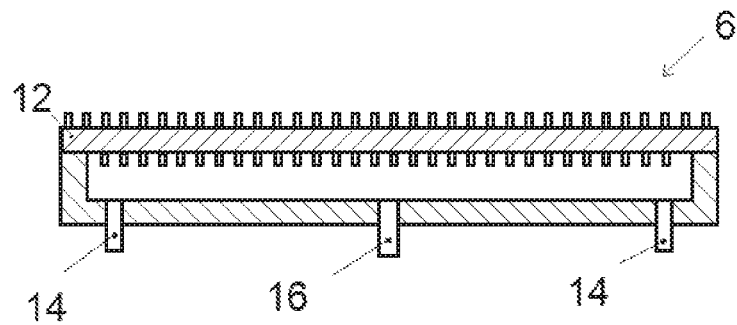
FIG. 5 shows a further embodiment of the invention. Improved heat transfer from the upper side of the construction space platform to the powder cake and to the cooling medium is achieved by an increase in the contact areas.

FIG. 5 shows a further embodiment of the invention. Improved heat transfer from the upper side (12) of the construction space platform to the powder cake and to the cooling medium is achieved by an increase in the contact areas. The contact area from the upper side (12) of the construction space platform (6) with the powder cake and/or with the cooling medium is increased by at least 20% compared to a flat surface. Preferably, the contact area from the upper side of the construction space platform with the powder cake and/or with the cooling medium is increased by at least 50% compared to a flat surface of a platform.

The present invention likewise provides a method for layer-by-layer production of three-dimensional objects in a powder bed fusion method. The method comprises the repeating steps of a) providing a powder (2), b) adjusting a temperature of the upper side (12) of the construction space platform (6) to at most 15° C. below a process temperature, c) adjusting a temperature in the construction space (1) below the melting temperature of the powder (process temperature), d) optionally applying a melting aid by means of inkjet to sites in the powder (2) that are to be sintered, e) applying electromagnetic energy to the powder for selective sintering by means of energy source (5), f) lowering the construction platform by one layer thickness, g) applying further powder (2) and h) repeating steps c to g until the three-dimensional object has been completed. In the first provision of a powder, it is preferable to provide a powder layer thickness of 4 to 10 mm.

The process temperature is the temperature of the powder in the construction field. The process temperature is preferably 10 to 20° C. below the melting point of the powder, preferably polymer powder.

It is a feature of the process that, after commencement of the production method, the temperature of the upper side (12) of the construction space platform (6) is lowered by at least 5° C. per 10 mm of construction progress until the upper side (12) of the construction space platform (6) has reached a temperature of not more than 50° C. The temperature of the construction space platform here is already being lowered during the construction process, After the construction process has commenced, the temperature of the upper side (12) of the construction space platform (6) is preferably lowered by at least 7° C. per 10 mm, more preferably 10° C. per 10 mm, of construction progress, until the upper side (12) of the construction space platform (6) has reached a temperature of not more than 50° C. Construction progress shall be considered here to mean the layer-by-layer lowering of the construction platform during the construction process. The temperature of the upper side of the construction space platform can be lowered in a linear manner or preferably in a greater than proportional manner with increasing construction progress. The effect of the latter case is that the temperature of the upper side (12) of the construction space platform (6) is lowered more quickly with increasing duration of the construction process.

LIST OF REFERENCE SYMBOLS

1 construction space
2 powder
3 sliding apparatus
4 construction field
5 energy source
6 construction space platform
7 three-dimensional object
8 construction space container
9 powder cake
10 construction field plane
11 outer face of the construction space container
12 upper side of the construction space platform
13 lower side of the construction space platform
14 outlet for cooling medium
15 flow machine driven from the outside
16 inlet for cooling medium
17 cooling channels

EXAMPLES

The apparatuses described in the examples were used to create three-dimensional objects. For the production of the three-dimensional objects, a PA12 powder having the properties listed in Table 1 was used. For this purpose, in all examples, a powder layer of 6 mm was placed onto the construction space platform and the entire construction space was preheated to a temperature of 168° C. for 180 minutes. The construction process was started (process temperature 174° C., layer thickness 0.15 mm), and a total of 36 tensile specimens (DIN ISO 527, exposure parameter set: speed, position and alignment of the objects identical in all examples) were constructed. 12 tensile specimens in each case were positioned in z direction (vertically) at the edge and in the middle of the construction field. The remaining 12 tensile specimens were positioned in x direction (horizontally) in the construction field. The height of the powder bed at the end of the construction process was 320 mm in each case. The duration of the construction process in the examples was 18 h 57 min. After the construction process had ended, the heating was switched off and the construction space container with the powder present therein was stored in a laser sintering machine for 72 h. Thereafter, the three-dimensional objects created were removed from the powder bed and tested. The powder was likewise removed from the construction space container and homogenized by means of a mixer. Subsequently, the solution viscosity (ISO 307, Schott AVS Pro, solvent: acidified m-cresol, volumetric method, double determination, dissolution temperature 100° C., dissolution time 2 h, polymer concentration 5 g/l, measurement temperature 25° C.) of the powder thus homogenized was measured.

TABLE 1

Powder characteristics

| | Value | Unit | Test type/test instrument/test parameter |
|---|---|---|---|
| Polymer | nylon-12 | | |
| Bulk density | 0.450 | g/cm$^3$ | DIN EN ISO 60 |
| Particle size d50 | 57 | µm | Malvern Mastersizer 2000, dry measurement, metered addition of 20-40 g of powder using Scirocco dry dispersion unit. Vibratory trough feed rate 70%, dispersing air pressure 3 bar. Sample measurement time 5 seconds (5000 individual measurements), refractive index and blue light value fixed at 1.52. Evaluation by Mie theory. |
| Particle size d10 | 36 | µm | Malvern Mastersizer 2000, see particle size d50 for parameters |
| Particle size d90 | 82 | µm | Malvern Mastersizer 2000, see particle size d50 for parameters |
| <10.48 µm | 1.4 | % | Malvern Mastersizer 2000, see particle size d50 for parameters |
| Flowability | 28 | s | DIN EN ISO 6186, Method A, diameter of nozzle outlet 15 mm |
| Solution viscosity | 1.58 | — | ISO 307, Schott AVS Pro, solvent: acidified m-cresol, volumetric method, double determination, dissolution temperature 100° C., dissolution time 2 h, polymer concentration 5 g/l, measurement temperature 25° C. |
| BET (spec. surface area) | 6.7 | m$^2$/g | ISO 9277, Micromeritics TriStar 3000, nitrogen gas adsorption, discontinuous volumetric method, 7 data points at relative pressures P/P0 from about 0.05 to about 0.20, dead volume calibration using He (99.996%), sample preparation 1 h at 23° C. + 16 h at 80° C. in vacuo, spec. surface area based on the devolatilized sample, evaluation by means of multipoint determination |
| Melting point, 1st heating | 187 | ° C. | DN 53765 Perkin Elmer DSC 7 heating/cooling rate 20K/min |
| Recrystallization temperature | 142 | ° C. | DIN 53765 Perkin Elmer DSC 7 heating/cooling rate 20K/min |
| Material conditioning | Material stored at 23° C. and 50% air humidity for 24 h prior to processing/analysis | | |

Example 1

SLS Machine (Noninventive)

A PA12 powder having the material characteristics from Table 1 was processed in an EOSINT P395 laser sintering machine from eos GmbH. The withdrawal chamber temperature was set to 130° C.

Example 2

SLS Machine (Inventive)

A PA12 powder having the material characteristics from Table 1 is processed in an EOSINT P395 laser sintering machine from eos GmbH. The heating of the withdrawal chamber was switched off.

The outer face of the con r n space container consisted of foam glass having a wall thickness of 40 mm.

The construction space platform was configured according to FIG. 4. The upper side of the construction space platform consisted of aluminium, and the lower side of foam glass. Compressed air was blown onto the upper side, and the air rate was adjusted under closed-loop control in accordance with the cooling output necessary. The construction space platform was adjusted to a temperature of 161° C. at the start of the construction process. After the construction process had commenced, the temperature of the upper side of the construction space platform was lowered by at least 7° C. per 10 mm of construction progress until the upper side of the construction space platform had reached a temperature of 49° C.

Tables 2 to 4 list the test results for the components created in each case and the solution viscosity of the homogenized powder. It can be seen that the three-dimensional objects have similar properties but, in the inventive example, the homogenized powder from the construction space container has undergone a significantly smaller increase in molecular weight. Moreover, the standard deviation of the mechanical characteristics of the components in z direction in Inventive Example 2 is distinctly smaller, which means more homogeneous component quality.

TABLE 2

Properties of the tensile specimens in x direction

|  | Example 1 | Example 2 |
|---|---|---|
| Modulus of elasticity (MPa) | 1753 | 1764 |
| Tensile strength (MPa) | 44 | 45 |
| Elongation at break (%) | 14 | 12 |
| Warpage | slight | slight |

TABLE 3

Properties of the tensile specimens in z direction

|  | Example 1 Average/standard deviation | Example 2 Average/standard deviation |
|---|---|---|
| Modulus of elasticity (MPa) | 1804/40 | 1805/30 |
| Tensile strength (MPa) | 47.3/2.2 | 47.9/0.9 |

TABLE 3-continued

Properties of the tensile specimens in z direction

|  | Example 1 Average/standard deviation | Example 2 Average/standard deviation |
|---|---|---|
| Elongation at break (%) | 7.3/3.8 | 6.5/1.4 |
| Warpage | slight | slight |

TABLE 4

Properties of the powder

|  | | |
|---|---|---|
| Solution viscosity of homogenized powder | 2.17 | 2.03 |

The invention claimed is:

1. An apparatus for layer-by-layer production of three-dimensional objects in a powder bed fusion method, the apparatus comprising:
a construction space,
at least one energy source,
a construction field having a construction space platform, and
a construction space container that laterally bounds the construction space platform,
wherein the construction space platform has an upper side facing a powder and a lower side remote from the powder,
wherein the upper side comprises a material having a thermal conductivity of at least 20 W/(m K), and
wherein the lower side comprises a material having a thermal conductivity of not more than 0.5 W/(m K),
wherein the upper side is permeated by cooling channels and a contact area of the upper side of the construction space platform with the powder or with a cooling medium is configured such that it is increased by at least 20% compared to a flat surface of the construction space platform, and
wherein the construction space platform comprises at least one distinct inlet for the cooling medium and at least one distinct outlet for the cooling medium.

2. The apparatus according to claim 1, wherein one or more flow machines driven from an outside of the construction space platform are integrated on the lower side.

3. The apparatus according to claim 1, wherein the at least one inlet and the at least one outlet are each disposed at the lower side of the construction space platform.

4. The apparatus according to claim 1, wherein the construction space container has an outer face, wherein the outer face comprises a material having a thermal conductivity of not more than 0.5 W/(m·K).

5. The apparatus according to claim 4, wherein the outer face of the construction space container has a layer thickness of at least 10 mm.

6. The apparatus according to claim 1, wherein the upper side comprises a material having a thermal conductivity of at least 80 W/(m·K), and wherein the lower side comprises a material having a thermal conductivity of not more than 0.3 W/(m·K).

7. The apparatus according to claim 1, wherein the upper side comprises a material having a thermal conductivity of at least 140 W/(m·K), and wherein the lower side comprises a material having a thermal conductivity of not more than 0.1 W/(m·K).

8. The apparatus according to claim 1, wherein the material of the lower side is foam glass, foam ceramic, expanded perlite, porous concrete, wood, a high temperature polymer, or thermally stable thermoset.

9. The apparatus according to claim 1, wherein the contact area of the upper side of the construction space platform with the powder or with a cooling medium is increased by at least 50% compared to a flat surface of the construction space platform.

10. The apparatus according to claim 1, wherein the material of the upper side is aluminum.

11. The apparatus according to claim 10, wherein the material of the lower side is foam glass.

12. The apparatus according to claim 1, wherein the construction space platform is configured such that the cooling medium can flow through it.

13. A method of layer-by-layer production of three-dimensional objects in an apparatus,
wherein the apparatus comprises an apparatus according to claim 1,
wherein the method comprises
   a. providing the powder in a layer thickness of at least 6 mm,
   b. adjusting a temperature of the upper side of the construction space platform to at most 15° C. below a process temperature,
   c. adjusting a temperature in the construction space below a melting temperature of the powder,
   d. applying a melting aid by inkjet to sites in the powder that are to be sintered,
   e. applying electromagnetic energy to the powder for selective sintering by energy source,
   f. applying further powder, and
   g. repeating steps d to f,
wherein, after commencement of the method, the temperature of the upper side of the construction space platform is lowered by at least 5° C. per 10 mm of construction progress until the upper side of the construction space platform has reached a temperature of not more than 50° C.

14. The method according to claim 13, wherein the temperature of the upper side of the construction space platform is lowered to a greater than proportional degree as the method continues.

15. The method according to claim 13, wherein one or more flow machines driven from an outside of the construction space platform are integrated on the lower side.

16. The method according to according to claim 13, wherein the at least one inlet and the at least one outlet are each disposed at the lower side of the construction space platform.

17. The method according to claim 13, wherein the construction space container has an outer face, wherein the outer face comprises a material having a thermal conductivity of not more than 0.5 W/(m·K).

18. The method according to claim 17, wherein the outer face of the construction space container has a layer thickness of at least 10 mm.

* * * * *